US006944615B2

(12) United States Patent
Teng et al.

(10) Patent No.: US 6,944,615 B2
(45) Date of Patent: Sep. 13, 2005

(54) SYSTEM AND METHOD FOR AVOIDING DEADLOCK SITUATIONS DUE TO PSEUDO-DELETED ENTRIES

(75) Inventors: James Zu-Chia Teng, San Jose, CA (US); Namik Hrle, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 09/894,090

(22) Filed: Jun. 28, 2001

(65) Prior Publication Data

US 2003/0004945 A1 Jan. 2, 2003

(51) Int. Cl.[7] ............................................. G06F 17/30
(52) U.S. Cl. ...................................... 707/8; 707/201
(58) Field of Search ............................ 707/8, 200, 201, 707/1

(56) References Cited

U.S. PATENT DOCUMENTS

| | | | |
|---|---|---|---|
| 4,914,569 A | | 4/1990 | Levine et al. |
| 4,961,134 A | * | 10/1990 | Crus et al. ..................... 707/8 |
| 5,119,490 A | | 6/1992 | Kurose |
| 5,123,104 A | * | 6/1992 | Levine et al. .................. 707/1 |
| 5,280,612 A | | 1/1994 | Lorie et al. |
| 5,442,758 A | * | 8/1995 | Slingwine et al. ............. 707/8 |
| 5,465,328 A | * | 11/1995 | Dievendorff et al. ......... 714/15 |
| 5,551,027 A | | 8/1996 | Choy et al. |
| 5,809,507 A | * | 9/1998 | Cavanaugh, III ....... 707/103 R |
| 5,960,194 A | | 9/1999 | Choy et al. |
| 6,009,425 A | | 12/1999 | Mohan |
| 6,032,216 A | | 2/2000 | Schmuck et al. |
| 6,047,285 A | | 4/2000 | Jacobs et al. |
| 6,070,164 A | * | 5/2000 | Vagnozzi ..................... 707/100 |
| 6,105,025 A | | 8/2000 | Jacobs et al. |
| 6,182,186 B1 | * | 1/2001 | Daynes ....................... 710/200 |
| 6,363,387 B1 | * | 3/2002 | Ponnekanti et al. ........... 707/10 |
| 2001/0047360 A1 | * | 11/2001 | Huras et al. ................. 707/102 |
| 2002/0087500 A1 | * | 7/2002 | Berkowitz et al. ............. 707/1 |

OTHER PUBLICATIONS

Technical Disclosure Bulletin: Locking Protocols for Concurrent Operations on B Trees:; Mar. 1977; pp. 3887–3889.
IBM Technical Disclosure Bulletin: "Concurrent Access of the Table Object Location Linked List"; Apr. 1993; pp. 541–544.

(Continued)

*Primary Examiner*—Safet Metjahic
*Assistant Examiner*—Brian Goddard
(74) *Attorney, Agent, or Firm*—Fay, Sharpe, Fagan, Minnich & McKee, LLP

(57) ABSTRACT

In a database management system (DBMS) (60) for a database application (10) including a database (12) having a table (14, 16, 18) and a unique key index (42) having indexes (44, 46, 48) therefor, the DBMS (60) includes a data manager (64), an index manager (66), a transaction manager (62), and a lock manager (68) which restricts access to the table by assigning locks to elements thereof. In order to avoid deadlock in the database application due to the pseudo-deleted entries, the lock categories include an X-lock and a Conditional S-lock, and have lock attributes including at least a Delete attribute for the X-lock. The Conditional S-lock is compatible (granted by the lock manager) with an X-lock whose Delete attribute is NOT SET, but is not compatible (granted) with an X-lock whose Delete attribute is SET. Each index entry includes a pseudo-delete flag which is SET by the index manager (66) to indicate deletion of the indexed row. Conditional upon locating a pseudo-deleted index key corresponding to a key to be added to the index, the index manager (66) requests a Conditional S-lock on the row indexed thereby, whereby the index manager (66) verifies the Delete transaction which set the pseudo-delete flag has committed.

15 Claims, 10 Drawing Sheets

OTHER PUBLICATIONS

"Operation–Specific Locking in Balanced Structures"; Alexandros Biliris; Information Sciences An International Journal; vol. 48, No. 1, Jun. 1989; pp. 27–51.

Concurrency Control in the Interpolation–Based Grid File: M.A. Ouksel, et al.; International Conference on Database and Expert Systems Applications, 3rd, Valencia, Spain, Sep. 2–4, 1992, Proceedings of DEXA '92; pp. 237–243.

"Study of Concurrent Operations on R–Trees"; J.K. Chen, et al.; Information Sciences; vol. 98, issue 1–4, May 1997; pp. 263–300.

* cited by examiner

FIG. 2(A)
(PRIOR ART)

Index (202)

| C1 | C2 | RID |
|---|---|---|
| A | 1 | 000201 |
| A | 2 | 000202 |
| B | 3 | 000203 |

Data Table (200)

| RID | C1 | C2 | C3 | C4 | Locks |
|---|---|---|---|---|---|
| 000201 | A | 1 | 46 | ABC | |
| 000202 | A | 2 | 54 | LMN | |
| 000203 | B | 3 | 23 | QWP | |
| 000204 | | | | | |

Lock Table (204)

| RID | Lock Attributes | Transaction |
|---|---|---|

FIG. 2(B)
(PRIOR ART)

Index (202, 212)

| C1 | C2 | RID | |
|---|---|---|---|
| A | 1 | 000201 | D |
| A | 2 | 000202 | D |
| B | 3 | 000203 | |

Data Table (200)

| RID | C1 | C2 | C3 | C4 | Locks |
|---|---|---|---|---|---|
| 000201 | A | 1 | 46 | ABC | X |
| 000202 | A | 2 | 54 | LMN | X |
| 000203 | B | 3 | 23 | QWP | |
| 000204 | | | | | |

Lock Table (204)

| RID | Lock Attributes | Transaction |
|---|---|---|
| 000201 | X | Delete C1=A |
| 000202 | X | Delete C1=A |

FIG. 2(C)
(PRIOR ART)

Index (202, 212)

| C1 | C2 | RID | |
|---|---|---|---|
| A | 1 | 000201 | D |
| A | 2 | 000202 | D |
| B | 3 | 000203 | |

Data Table (200)

| RID | C1 | C2 | C3 | C4 | Locks |
|---|---|---|---|---|---|
| 000201 | A | 1 | 46 | ABC | X |
| 000202 | A | 2 | 54 | LMN | X |
| 000203 | B | 3 | 23 | QWP | |
| 000204 | A | 1 | 86 | NEW | X |

(222, 210, 220)

Lock Table (204)

| RID | Lock Attributes | Transaction |
|---|---|---|
| 000201 | X | Delete C1=A |
| 000202 | X | Delete C1=A |
| 000204 | X | Insert Trans. |

FIG. 3(A) (PRIOR ART)

Index (302)

| C1 | C2 | RID |
|----|----|--------|
| A | 1 | 000201 |
| A | 2 | 000202 |
| B | 3 | 000203 |
| B | 4 | 000204 |

Data Table (300)

| RID | C1 | C2 | C3 | C4 | Locks |
|--------|----|----|----|-----|-------|
| 000201 | A | 1 | 46 | ABC | |
| 000202 | A | 2 | 54 | LMN | |
| 000203 | B | 3 | 23 | QWP | |
| 000204 | B | 4 | 97 | VED | |

Lock Table (304)

| RID | Lock Attributes | Transaction |
|-----|-----------------|-------------|

FIG. 3(B) (PRIOR ART)

Index (302, 312)

| C1 | C2 | RID | |
|----|----|--------|---|
| A | 1 | 000201 | D |
| A | 2 | 000202 | D |
| B | 3 | 000203 | D |
| B | 4 | 000204 | D |

Data Table (300)

| RID | C1 | C2 | C3 | C4 | Locks |
|--------|----|----|----|-----|-------|
| 000201 | A | 1 | 46 | ABC | X |
| 000202 | A | 2 | 54 | LMN | X |
| 000203 | B | 3 | 23 | QWP | X |
| 000204 | B | 4 | 97 | VED | X |

(310)

Lock Table (304)

| RID | Lock Attributes | Transaction |
|--------|-----------------|-------------|
| 000201 | X | T1 |
| 000202 | X | T1 |
| 000203 | X | T2 |
| 000204 | X | T2 |

FIG. 3(C) (PRIOR ART)

Index (302, 312)

| C1 | C2 | RID | |
|----|----|--------|---|
| A | 1 | 000201 | D |
| A | 2 | 000202 | D |
| B | 3 | 000203 | D |
| B | 4 | 000204 | D |

Data Table (300)

| RID | C1 | C2 | C3 | C4 | Locks |
|--------|----|----|----|----|-------|
| 000201 | | | | | |
| 000202 | | | | | |
| 000203 | | | | | |
| 000204 | | | | | |

(314)

Lock Table (304)

| RID | Lock Attributes | Transaction |
|-----|-----------------|-------------|

```
        302   312              300                           304
    ┌─────────────┐    ┌──────────────────────┐    ┌──────────────────────────────┐
    │ Index       │    │    Data Table        │    │ Lock Table                   │
    │ C1 C2  RID  │    │ RID    C1 C2 C3  C4  Locks│ RID    Lock Attributes Transaction│
    │ A  1  000201 D│  │ 000201 B  3  57  BKM  X  │ 000203 X                T3   │
    │ A  2  000202 D│  │ 000202                   │ 000201 X                T4   │
    │ B  3  000203 D│  │ 000203 A  1  77  SFR  X  │                              │
    │ B  4  000204 D│  │ 000204                   │                              │
    └─────────────┘    └──────────────────────┘    └──────────────────────────────┘
                         318 322 320  316
```

FIG. 3(D)
(PRIOR ART)

```
        302   312              300                           304
    ┌─────────────┐    ┌──────────────────────┐    ┌──────────────────────────────┐
    │ Index       │    │    Data Table        │    │ Lock Table                   │
    │ C1 C2  RID  │    │ RID    C1 C2 C3  C4  Locks│ RID    Lock Attributes Transaction│
    │ A  1  000201 D│  │ 000201 B  3  57  BKM  X  │ 000203 X                T3   │
    │ A  2  000202 D│  │ 000202                   │ 000201 X                T4   │
    │ B  3  000203 D│  │ 000203 A  1  77  SFR  X  │ 000201 S-lock in queue  T3   │
    │ B  4  000204 D│  │ 000204                   │                    326      │
    └─────────────┘    └──────────────────────┘    └──────────────────────────────┘
                         318 322 320  316
```

FIG. 3(E)
(PRIOR ART)

```
        302   312              300                           304
    ┌─────────────┐    ┌──────────────────────┐    ┌──────────────────────────────┐
    │ Index       │    │    Data Table        │    │ Lock Table                   │
    │ C1 C2  RID  │    │ RID    C1 C2 C3  C4  Locks│ RID    Lock Attributes Transaction│
    │ A  1  000201 D│  │ 000201 B  3  57  BKM  X  │ 000203 X                T3   │
    │ A  2  000202 D│  │ 000202                   │ 000201 X     326        T4   │
    │ B  3  000203 D│  │ 000203 A  1  77  SFR  X  │ 000201 S-lock in queue  T3   │
    │ B  4  000204 D│  │ 000204                   │ 000203 S-lock in queue  T4   │
    └─────────────┘    └──────────────────────┘    └──────────────────────────────┘
                         318 322 320  316                        328
```

FIG. 3(F)
(PRIOR ART)

SYSTEM AND METHOD FOR AVOIDING DEADLOCK SITUATIONS DUE TO PSEUDO-DELETED ENTRIES

BACKGROUND OF THE INVENTION

The present invention relates to the management of computer databases, and more particularly to a method for avoiding deadlock situations during index updates in a database application which uses a unique key index and the pseudo-deletion of index entries.

Database applications are an important use of modem computer systems, and especially modem networked computer systems. Among other uses, computer databases store business data such as inventories, sales information, personnel information, and the like. One advantage of implementing a database on a networked computer system is to provide the ability for multiple users, often at multiple locations or access points, to work essentially simultaneously with a single shared database. For example, a retail store chain may use a single shared database which is accessed by the various individual store outlets. A first store may add newly acquired merchandise to the inventory table of a shared database. The inventory table is accessible to all the stores in the chain, and a second store in the chain may advantageously search the inventory table, locate the merchandise being held at the first store, and request a reallocation of some portion of this merchandise to the second store if sales information, perhaps recorded in a sales table of the same shared database, indicates that the merchandise may be more effectively retailed at the second store. Thus, the shared and networked database permits more efficient allocation and use of the shared resources of the retail store chain. Of course, similar benefits arise from the use of networked databases in conjunction with other types of distributed businesses, as well as in conjunction with geographically distributed organizations such as religious and political organizations.

With reference to FIG. 1, an exemplary database application 10 for management of a sporting goods retail organization is schematically shown in simplified form. A database 12 includes a plurality of table objects, namely an inventory table 14, a sales table 16, and a human resources table 18. Each table contains a specific number of columns and some unordered rows, as shown for example in a more detailed schematic of the inventory table 14'. The detailed schematic of the inventory table 14' shows that it includes four data columns, namely a store ("Store") column 22, an item ("Item") column 24, a model ("Model") column 26, and a quantity ("Qty") column 28. Of course, other columns may be included such as a product manufacturer column, and the number and type of columns is typically different for each table object. The number and identity of columns in a table defines the structure of that table, and is not generally modifiable by ordinary database users, although a database administrator or other individual with high-level access privileges may be able to modify the table structure. Similarly, the number and identity of the tables are normally fixed for ordinary users, and are modifiable only by users with special access privileges.

The data in each table typically consists of unordered rows formed according to the table column structure. Each row is indexed by a record index (RID) 30 as illustrated in the detailed schematic of the inventory table 14'. The rows are not typically arranged in any particular order. For example, in the exemplary inventory table 14' a blank row 40 with RID=0014 is interspersed among the rows containing data. Blank row 40 may have resulted from a deleted record at the record index RID=0014. Users with ordinary access privileges typically have the ability to add, delete, or change rows of a table, typically within suitable predefined bounds.

To provide organization of the database, a unique key index 42 is maintained, with separate indexes for each table. Thus, the unique key index 42 includes an inventory table index 44, a sales table index 46, and a human resources table index 48. Each table index contains a specific number of columns and some rows, as shown for example in a more detailed schematic of the inventory table index 44'. The detailed schematic of the inventory table index 44' shows that it includes three columns, namely a store ("Store") column 52, a model ("Model") column 54, and a record index ("RID") column 56. In the example, each row of the inventory table index 44' corresponds to a row of the inventory table 14' but contains only the store and model information of that row, as well as the table row RID. Thus, the inventory table index 44 indexes the inventory table 14 using the store 22 and the model 26 columns of the inventory table 14, and the table row RID serves as the pointer to the table row.

The ordered column combination: (store 22, model 26) is often called the index key. To be considered a unique index key, the number and type of table columns defining the key must guarantee that each index row identifies a unique table row. Thus, inventory table index 44 could not use as an index key the ordered column combination: (store 22, item 24), as this is not a unique key (e.g., RID=0012 and RID=0015 both include store=East and item=skis). Of course, an index key is not limited to two columns, but may include as few or as many columns as is necessary to define a unique key.

An important component of a database application, and particularly of a networked database application, is the database management system (DBMS) 60. The DBMS controls the storage, retrieval, and modification of data in the database, ensures that retrieved data is current, and that data modifications do not compromise the integrity of the database. For example, the DBMS ensures that the unique key rule described above is obeyed whenever a table index is modified. For instance, the DBMS prevents entry of a new record in inventory table 14 at RID=0014 with a store value of "West" and a model value of "XS500", as this entry would conflict with the record at RID=0010 which already has this key value.

In the exemplary schematic of FIG. 1, the DBMS 60 includes four components: a transaction manager 62, a data manager 64, an index manager 66, and a lock manager 68. It is to be appreciated that the illustrated DBMS 60 is exemplary and highly simplified in contrast to an actual DBMS used with a commercial database. Commercial database DBMS may include additional components, such as components to store and manage the database history, to produce printed reports, and the like.

In operation, the transaction manager 62 receives transaction requests. The transaction manager 62 assigns an identifier to the transaction, monitors the progress of each transaction, and is responsible for transaction completion, or for transaction failure recovery in the event that the transaction cannot be completed successfully. Typical transactions of particular interest herein include delete transactions and insert transactions, whereby records are deleted or inserted into a table object. However, it is to be appreciated that transactions may be more complex and may include composite transactions with multiple delete and/or insert elements, as well as record modification operations and the like. Single transactions can also interact with multiple table objects. For example, a transaction which records a sale by the South store of one model MD100 ski would typically include updating of at least the sales table 16, wherein the sale is recorded, and the inventory table 14. The inventory table 14' update reduces the quantity column 28 value of row RID=0013 from "40" to "39" to reflect the inventory reduction at the South store resulting from the sale of one model MD100 ski. The transaction manager 62 communicates with both the data manager 64 and the index manager 66, which control modification of the database 12 and the unique key index 42, respectively.

The simplified DBMS 60 also includes a lock manager 68. The lock manager 68 limits access to the database 12 by requiring that DBMS components obtain a lock on the target row or rows prior to accessing said rows. Lock types which are available include at least exclusive locks—"X-locks" and shared locks—"S-locks". These locks may be placed on rows, tables, or other database elements depending upon the DBMS configuration. Typically, X-locks are granted to transactions which modify a row or rows (including insert and delete operations), gain access to the target tables through the lock manager 68 using an exclusive lock ("X-lock") request. Transactions which only read the contents of a row or rows without modifying the contents gain access to the data using shared lock ("S-lock") requests.

The lock manager 68 ensures the integrity of the database 12 by issuing locks based upon lock compatibility to prevent multiple transactions from accessing the data simultaneously. For example, the lock manager will not grant more than one X-lock request for a single table row because concurrent X-locks on the same row could result in data inconsistencies as different data is written by the different transactions holding the X-locks. Thus, relative to table rows an X-lock is incompatible with another X-lock, so that after a first X-lock is placed on a first row, the lock manager denies requests for subsequent X-locks to that first row until the first X-lock is removed. However, two or more transaction requesting S-locks are typically compatible, as no inconsistency will result from two different processes that merely read a single record essentially simultaneously without modifying the record. The lock manager therefore typically grants a second S-lock to a row which already has one S-lock applied.

The prior art teaches the use of lock managers to ensure the integrity of the database data. Concurrent transactions are prevented from corrupting the data through the issuance of locks based upon lock compatibility. However, prior art methods fail to prevent certain "deadlock" situations which may arise when essentially simultaneous transactions compete for lock request control over the same rows. In these cases, two different transactions may attempt to place locks on the same table rows, and the resulting interference results in both transactions competing for the data being suspended indefinitely causing a system deadlock.

There is a need, therefore, to provide an improved database management system and method which overcomes these deadlock limitations.

SUMMARY OF THE INVENTION

The present invention is typically implemented using one or more computer programs, each of which executes under the control of an operating system, such as OS/2, Windows, DOS, AIX, UNIX, MVS, etc., and causes a computer to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer product" as used herein are intended to encompass a computer program accessible from any computer readable device or media.

Moreover, the computer programs and operating system are comprised of instructions which, when read and executed by a computer, cause the computer to perform the steps necessary to implement and/or use the present invention. Under control of the operating system, the computer programs may be loaded from the memory, data storage devices, and/or data communications devices into the memories of the computer for use during actual operations. Those skilled in the art will recognize many modifications may be made to this configuration without departing from the scope of the present invention.

In accordance with one aspect of the present invention, a database management system (DBMS) for managing a database application is disclosed. The database application includes a database having at least one table, and an index having at least one unique key table index corresponding to the at least one table. A data manager manages updates of the database. An index manager manages updates of the unique key table index. A transaction manager executes database transactions in cooperation with the index manager. A lock manager cooperates with the index manager and the data manager to restrict access to a first table element by assigning one or more locks thereto. These locks are selected from a plurality of lock types, including at least an exclusive X-lock that enables exclusive access, and an unconditional S-lock that enables shared access and is selectively assigned to a table element conditional upon the table element being without an X-lock assigned thereto. The lock types also have attributes associated therewith. The categories of said attributes include at least a Delete attribute indicative of a transaction holding the X-lock being a delete transaction.

Preferably, the plurality of lock types further includes a Conditional S-lock that enables shared access and is assigned to a table element conditional upon the table element having no X-lock whose Delete attribute is "SET" or "ON" assigned thereto. Preferably, the associated unique key table index further includes a pseudo-delete flag corresponding to each key entry that is selectively set by the index manager to indicate deletion of the table row corresponding to the index key entry. The index manager is preferably adapted to execute a predefined set of steps conditional upon receiving a request to enter an index key entry and a corresponding new row RID in which the index key entry corresponds to an existing index key entry whose pseudo-delete flag is "SET" or "ON". The set of steps include requesting a Conditional S-lock on the table row corresponding to the existing index key entry; and, conditional upon the Conditional S-lock being granted, updating the table index key entry with the new row RID, releasing the Conditional S-lock and resetting the pseudo-delete flag.

Preferably, the index manager is further adapted execute an additional predefined set of steps conditional upon receiving a request to enter an index key entry and a corresponding new row RID in which the index key entry corresponds to an existing index key entry whose pseudo-delete flag is "SET" or "ON". When the Conditional S-lock is denied, requesting an unconditional S-lock on the table row corresponding to the existing index key entry; and, upon granting of the unconditional S-lock, updating the table index key entry with the new row RID, releasing the unconditional S-lock and resetting the pseudo-delete flag.

Preferably, the index manager is still further adapted to execute steps conditional upon receiving a request to enter an index key entry and a corresponding new row RID in which the index key entry corresponds to an existing index key entry whose pseudo-delete flag is not "SET", "RESET", or OFF". The steps include requesting an unconditional S-lock on the table row corresponding to the existing index key entry; and, upon granting of the unconditional S-lock, conditional upon the index key entry having its pseudo-delete flag "SET" or "ON", updating the table index key entry with the new row RID, releasing the unconditional S-lock and resetting the pseudo-delete flag.

In accordance with another aspect of the present invention, a database management method is disclosed for entering a key and a new row RID into a unique key table index of a database application that uses pseudo-deletion of table index entries. The unique key table index is searched for the key. Conditional upon locating a pseudo-deleted table index entry corresponding to the key during the searching step, a Conditional S-lock is requested on a table row indexed by the pseudo-deleted table index entry, and, conditional upon receiving an indication that the Conditional S-lock is granted, the table index entry is updated with the new row RID and resetting the pseudo-delete flag. Conditional upon not locating a table index entry corresponding to the key during the searching step, the table index is updated by adding the key and the new row RID.

Preferably, the step of receiving an indication that the Conditional S-lock is granted includes the steps of: granting the Conditional S-lock conditional upon the table row indexed by the pseudo-deleted table index entry not having an X-lock assigned thereto; granting the Conditional S-lock conditional upon the table row indexed by the pseudo-deleted table index entry having an X-lock assigned thereto wherein said X-lock has a Delete attribute that is not set, reset, or off; and receiving an indication that the Conditional S-lock is granted conditional upon the granting of the Conditional S-lock.

Preferably, the method further includes the steps, to be executed conditional upon receiving an indication that the Conditional S-lock is denied, of: requesting an unconditional S-lock on the table row indexed by the pseudo-deleted table index entry; and conditional upon receiving an indication that the unconditional S-lock is granted, updating the table index entry with the new row RID and resetting the pseudo-delete flag.

The method preferably further including the steps, to be executed conditional upon locating a table index entry that is not pseudo-deleted during the searching step, of: requesting an unconditional S-lock on the table row indexed by the located table index entry; and, upon granting of the unconditional S-lock and conditional upon the located table index entry being pseudo-deleted, updating the table index entry with the new row RID and resetting the pseudo-delete flag.

In accordance with yet another aspect of the present invention, an article of manufacture is disclosed, comprising a program storage medium readable by a computer and embodying one or more instructions executable by the computer to perform method steps for entering a key and a new row RID into a unique key table index of a database stored on a data store connected to the computer. The unique key table index is one which uses pseudo-deletion of table index entries. The performed method steps are as follows. The unique key table index is searched for the key. Conditional upon locating a pseudo-deleted table index entry corresponding to the key during the searching step, a Conditional S-lock is requested on a table row indexed by the pseudo-deleted table index entry, and, conditional upon receiving an indication that the Conditional S-lock is granted, the table index entry is updated with the new row RID and resetting the pseudo-delete flag. Conditional upon not locating a table index entry corresponding to the key during the searching step, the table index is updated by adding the key and the new row RID.

Preferably, the step of receiving an indication that the Conditional S-lock is granted includes the steps of: granting the Conditional S-lock conditional upon the table row indexed by the pseudo-deleted table index entry not having an X-lock assigned thereto; granting the Conditional S-lock conditional upon the table row indexed by the pseudo-deleted table index entry having an X-lock assigned thereto wherein said X-lock has a Delete attribute that is not set, reset, or off; and receiving an indication that the Conditional S-lock is granted conditional upon the granting of the Conditional S-lock.

Preferably, the method further includes the steps, to be executed conditional upon receiving an indication that the Conditional S-lock is denied, of: requesting an unconditional S-lock on the table row indexed by the pseudo-deleted table index entry; and conditional upon receiving an indication that the unconditional S-lock is granted, updating the table index entry with the new row RID and resetting the pseudo-delete flag.

The method preferably further including the steps, to be executed conditional upon locating a table index entry that is not pseudo-deleted during the searching step, of: requesting an unconditional S-lock on the table row indexed by the located table index entry; and, upon granting of the unconditional S-lock and conditional upon the located table index entry being pseudo-deleted, updating the table index entry with the new row RID and resetting the pseudo-delete flag.

One advantage of the present invention is that it prevents deadlock situations when essentially simultaneous transactions request incompatible locks on the same row or rows.

Another advantage of the present invention is that it overcomes prior art limitations which arise from the use of pseudo-deleted index entries.

Another advantage of the present invention is that it increases database efficiency by preventing deadlocks and corresponding time-outs.

Still another advantage of the present invention is that it improves the efficiency and reliability of the index manager by providing an improved method and DBMS for updating the index in the presence of pseudo-deleted index entries.

Still further advantages and benefits of the present invention will become apparent to those of ordinary skill in the art upon reading and understanding the following detailed description.

BRIEF DESCRIPTION OF THE DRAWINGS

The invention may take form in various components and arrangements of components, and in various steps and arrangements of steps. The drawings are only for the purposes of illustrating preferred embodiments and are not to be construed as limiting the invention.

FIGS. 2(A)–2(F) are a sequence of database tables to show a prior art database management method for deleting and inserting entries in a database table;

FIGS. 3(A)–3(F) are a sequence of database tables to show a condition where the prior art database management method enters into a deadlock state;

DETAILED DESCRIPTION OF THE PREFERRED EMBODIMENTS

The present invention improves prior art DBMS by overcoming a potential deadlock situation between two or more transactions. With particular reference to FIGS. 2A–2F and 3A–3F, the limitations of prior art DBMS will be shown. Subsequently, and with particular reference to FIGS. 4A–4F and 5A–5H, the improved DBMS will be described and shown to overcome the limitations of prior art DBMS.

Figure 2D:
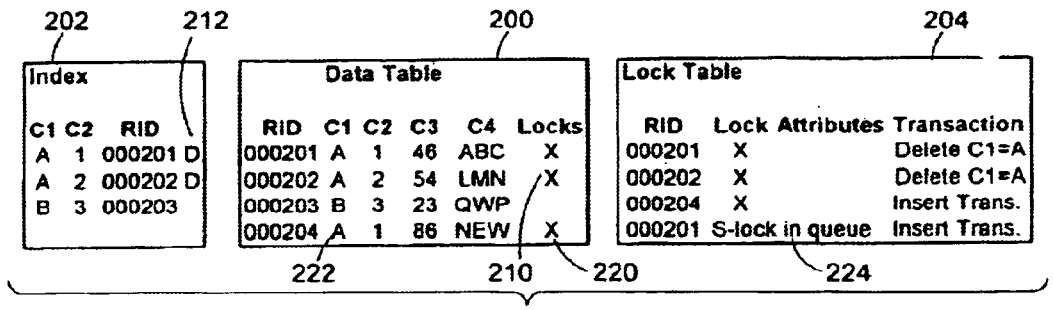

With reference now to FIG. 2(A)-2(F), a simplified typical transaction sequence according to a prior art DBMS will be described to illustrate lock manager protection of data integrity. FIG. 2(A) shows the initial state of the relevant portion of a data table 200 and its associated index table 202, as well as an associated lock table 204. The index table 202 is a unique key table that operates on a unique key (C1,C2). As seen in lock table 204, at least information on the row identification ("RID"), the lock type ("Lock"), lock attributes ("Attributes"), and the transaction holding the lock ("Transaction") are recorded therein. In FIG. 2(A), however, no locks are yet assigned.

Figure 1:
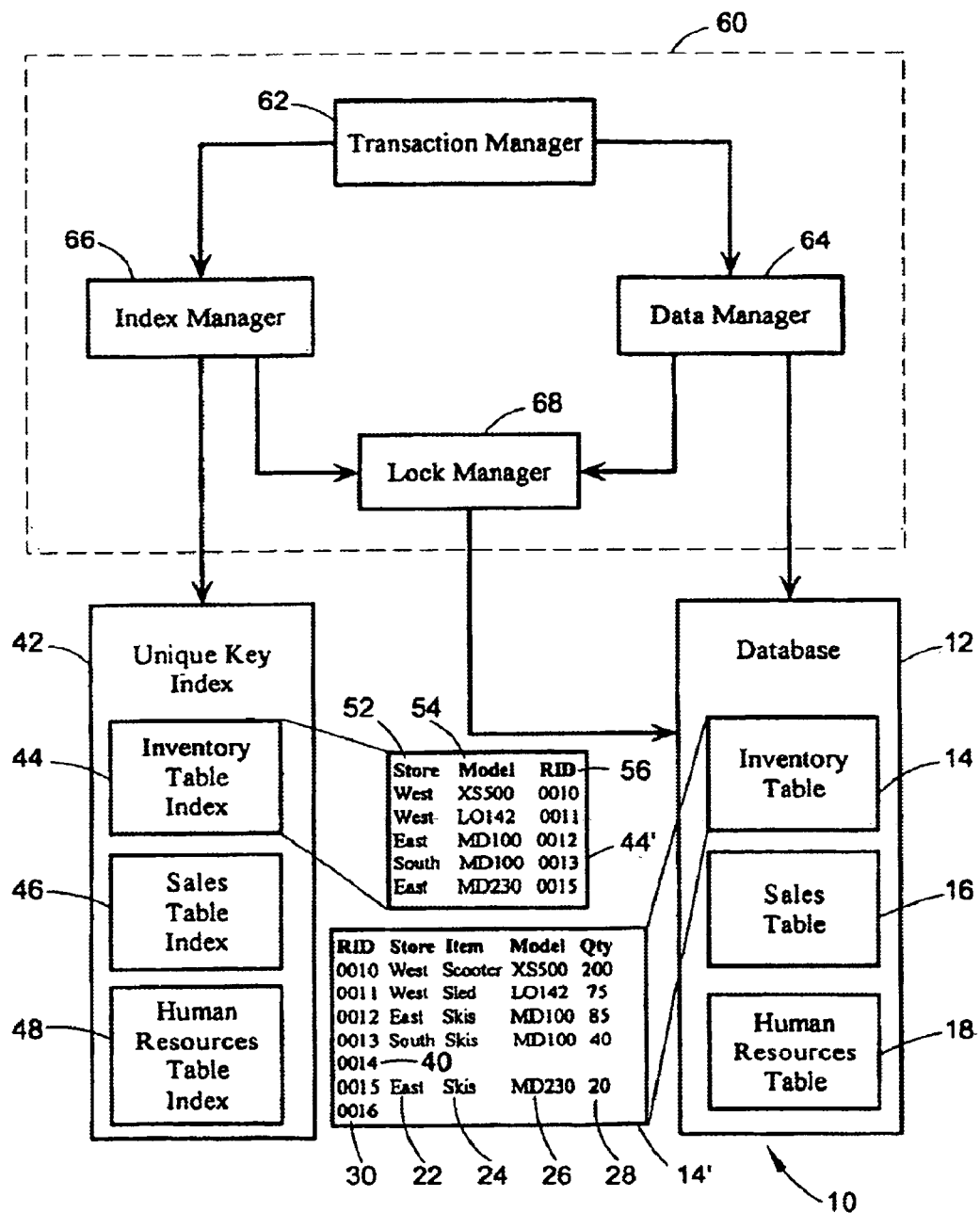
FIG. 1 is a simplified schematic diagram of a database management system.

With reference to FIG. 2(B) and with continuing reference to FIG. 1, a delete transaction is initiated by the transaction manager 62. The delete transaction of the example instructs deletion of all rows for which C1=A. It will be observed that rows RID=000201 and RID=000202 meet this criterion. As shown in the data table 200, X-locks 210 are placed on rows RID=000201 and RID=000202 by the lock manager 68, and corresponding information is written into the lock table 204. Also, the index table 202 is updated by the index manager 66 to include an indication that the rows RID=000201 and RID=000202 are to be deleted, as indicated by a delete ("D") flag 212 marking those index entries. Although the Delete C1=A transaction has been initiated at the time shown in FIG. 2(B), it is not yet fully implemented, or "committed". Therefore, the information contained in rows RID=000201 and RID=000202 has not yet been actually removed but only marked for removal. Such a delay between transaction initiation and the committing thereof is a common occurrence in typical DBMS's.

The situation of FIG. 2(B) may evolve, for example, if the "Delete C1=A" transaction is an element of a composite transaction which also includes other transaction elements (not shown). In that case, an inability to carry out one or more other elements of the composite transaction would necessitate cancellation of the composite transaction including the Delete C1=A element. In a composite transaction, therefore, all transaction elements are typically committed only after every element has obtained the necessary locks, so that successful completion of the entire transaction is assured before the composite transaction elements are committed.

With reference now to FIG. 2(C) and with continuing reference to FIG. 1, the Delete C1=A transaction remains uncommitted, while a second, typically unrelated transaction is initiated. By way of example, the second transaction is an Insert transaction. The transaction manager 62 via the data manager 64 obtains an X-lock 220 on row RID=000204 of the data table 200 via the lock manager 68, and inserts the data 222 into data table 200 via the data manager 64.

With reference now to FIG. 2(D) and with continuing reference to FIG. 1, the index manager 66 next attempts to update the index table 202 to reflect the inserted row 222. The index manager 66 locates an entry with key C1,C2=A,1 already in the index table 202 which points to data table row RID=000201. However, this index entry is flagged for deletion 212, i.e. it is pseudo-deleted. After the Delete C1=A transaction has committed, the key C1,C2=A,1 becomes available and the index manager 66 is free to update the index from RID=000201 to RID=000204. In typical database applications, the index entries corresponding to items which have been deleted (Delete transaction initiated and committed) remain in the index, flagged as pseudo-deleted, rather than being actually removed from the table index. Preserving pseudo-deleted index entries across commits has major performance benefits, as is well-known to those skilled in the art.

The index manager therefore checks whether the deletion of row RID=000201 has been committed by requesting a shared S-lock through the lock manager 68. Because an S-lock is incompatible with an X-lock, the lock manager queues the S-lock request 224. This action suspends the Insert transaction, thereby preserving data integrity by ensuring that the unique key rule that governs the unique key index 202 is obeyed. The incompatibility between an S-lock and an X-lock reflects uncertainty in the integrity of the information retrieved by the transaction requesting the S-lock in the presence of an X-lock belonging to an uncommitted transaction.

Figure 2E:
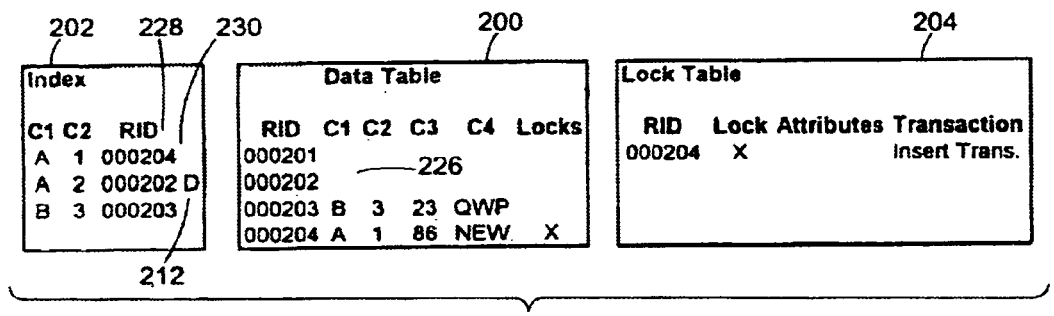

With reference now to FIG. 2(E) and with continuing reference to FIG. 1, the Delete C1=A transaction next commits. The data is deleted 226, and the queued S-lock 224 (FIG. 2(D)) is granted, indicating that the exclusive X-locks held by the Delete C1=A transaction have been released. After the shared S-lock 224 requested by the Insert transaction is granted, the index manager 66 replaces the row RID=000201 in the unique key index table 202 with the row value RID=000204 228 and resets the pseudo-delete flag 230. The lock information in connection with the Insert transaction related to row RID=000204 remains in the lock table 204. It is to be appreciated that the index entries of the deleted items at row RID=000202 remain only pseudo-deleted, i.e. flagged as deleted 212, but remain in the unique key index table 202. Such pseudo-deletion of index entries corresponding to deleted rows wherein the deleting has committed has major performance benefits, as is well-known to those skilled in the art and as was mentioned above.

Figure 2F:
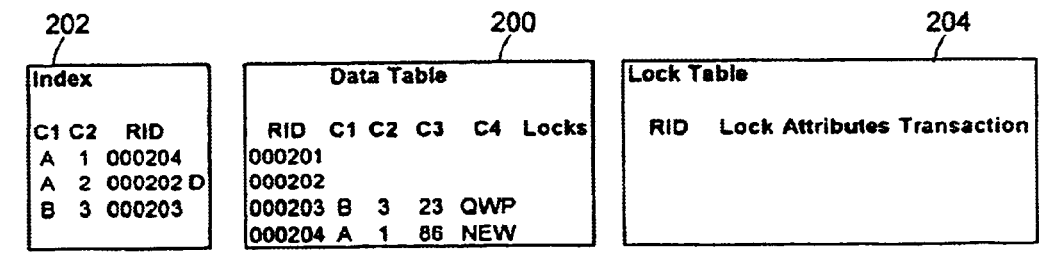

With reference now to FIG. 2(F) and with continuing reference to FIG. 1, the Insert transaction is shown committed and the X-lock on row RID=000204 released. It will be appreciated from the operations depicted in FIGS. 2(A)–2(F) that the lock manager has successfully prevented a potential compromise of data integrity by preventing the index manager from performing the index update of FIG. 2(F) before the previous delete transaction commits and removes its X-lock from row RID=000201.

The prior art DBMS is seen to perform properly in the transaction sequence of FIGS. 2(A)–2(F). With reference now to FIGS. 3(A)-3(F), however, a second transaction sequence according to the prior art DBMS will be described, to illustrate formation of a deadlock situation. FIG. 3(A) shows the relevant portions of an initial data table 300 with four rows of data, an index table 302 corresponding thereto, and a lock table 304. There are no locks depicted in FIG. 3(A).

With reference to FIG. 3(B) and with continuing reference to FIG. 1, two essentially simultaneous Delete transactions T1 and T2 are initiated. Transaction T1 instructs deletion of rows with C1=A, and transaction T2 instructs deletion of rows with C1=B. As all rows shown have C1=A or C1=B, the transaction manager 62 requests, via the data manager 64, that X-locks 310 be placed on all four rows. The lock manager 68 grants the X-locks, and the X-lock parameters are recorded in the lock table 304 as shown. Additionally, the corresponding index entries are flagged as deleted 312 by the index manager 66.

With reference to FIG. 3(C) and with continuing reference to FIG. 1, delete transactions T1 and T2 commit. The data is deleted 314 from the data table 300 and the locks 310 are removed. Importantly, however, the index entries flagged for deletion 312 remain in the unique key index table 302.

With reference now to FIG. 3(D) and with continuing reference to FIG. 1, two new transactions T3 and T4 are initiated by the transaction manager 62 before the index entries flagged for deletion 312 are removed from the index table 302. Transaction T3 is an Insert transaction that instructs insertion of a row C1,C2,C3,C4=A,1,77,SFR. Transaction T4 is an Insert transaction that instructs insertion of a row C1,C2,C3,C4=B,3,57,BKM. In this example, the two transactions are initiated essentially simultaneously. It will be recognized that the likelihood of such essentially simultaneous transaction initiation is increased as the size of the database increases, and as the number of database access points increases such as, for example, in a networked database. The data manager 64 searches for available rows in the data table 300. The data manager 64 locates and locks 316 row RID=000203, and writes the data of transaction T3 therein 318. The data manager 64 also locates and locks 320 row RID=000201, and writes the data of transaction T4 therein 322. The lock parameters are recorded in the lock table 304 as shown.

With reference now to FIG. 3(E) and with continuing reference to FIG. 1, the transaction manager 62 next instructs the index manager 66 to update the index table 302 to reflect the inserted entry 318 of transaction T3. The index manager 66 finds an entry with key C1,C2=A,1 already in the unique key index table 302 which points to data table row RID=000201. However, this index entry is flagged for deletion 312, i.e. it is pseudo-deleted. If the Delete transaction has committed, then the key C1,C2=A,1 is available and the index manager 66 is free to update the index. The index manager therefore requests an S-lock of row RID=000201 through the lock manager 68 to determine whether the Delete transaction T1 has actually committed. The lock manager locates an X-lock 320, which transaction T4 placed on row RID=000201. Therefore, the S-lock request of transaction T3 is simply queued 326 in the lock table 304 as shown. This action suspends the transaction T3, which cannot continue until transaction T4 removes its X-lock 320.

With reference now to FIG. 3(F) and with continuing reference to FIG. 1, the transaction manager 62 now instructs the index manager 66 to update the index table 302 to reflect the inserted entry 322 of transaction T4. The index manager 66 finds an entry with key C1,C2=B,3 already in the index table 302 which points to data table row RID=000203. However, this index entry is flagged for deletion 312, i.e. it is pseudo-deleted due to the action of the Delete transaction T2. If the Delete transaction T2 has actually committed, then the key C1,C2=B,3 is available and the index manager 66 is free to update the index. The index manager therefore requests an S-lock through the lock manager 68 to determine if the Delete transaction T2 has committed. The lock manager locates the X-lock 316 which transaction T3 placed on row RID=000203. Therefore, the S-lock request of transaction T4 is simply queued 328 in the lock table 304 as shown. This action suspends the transaction T4, which cannot continue until transaction T3 removes its X-lock 316.

Thus, at the time of FIG. 3(F), a deadlock is reached. Transaction T3 cannot continue until transaction T4 removes its X-lock of RID=000201, which however cannot continue until transaction T3 removes its X-lock of RID=000203. In FIGS. 3(E)–3(F), it was assumed that the S-lock of transaction T3 was requested before the S-lock of transaction T4. However, it will be appreciated that an equivalent deadlock situation would have been reached if the S-lock of transaction T4 had been requested first. The deadlock arises because the prior art DBMS effectively assumes that the X-lock encountered in FIG. 3(E) or FIG. 3(F) is due to the Delete transaction having not yet committed, and is unable to recognize that the encountered X-lock is in fact due to a subsequent Insert transaction.

In the present invention, the deadlock which results from implementation of the transaction sequence of FIGS. 3(A)–3(F) by prior art DBMS is overcome. The improved DBMS includes a new X-lock attribute, called a "Delete" attribute herein although any other suitable designation could be used. A Delete attribute flag or other indicia is set when the X-lock is granted to a Delete transaction. The improved DBMS also includes a new Conditional S-lock, whose compatibility and behavior relative to X-locks is as follows. The Conditional S-lock is not compatible with an X-lock whose Delete attribute flag is SET or ON. However, the Conditional S-lock is compatible with an X-lock whose Delete attribute flag is NOT SET or OFF. Essentially, the new Conditional S-lock is granted when the previous X-lock requester was not a delete operation. As will be described with reference to FIGS. 4 and 5, the improved DBMS overcomes deadlock situations such as the deadlock situation depicted in FIGS. 3(A)–3(F).

Figure 4A:
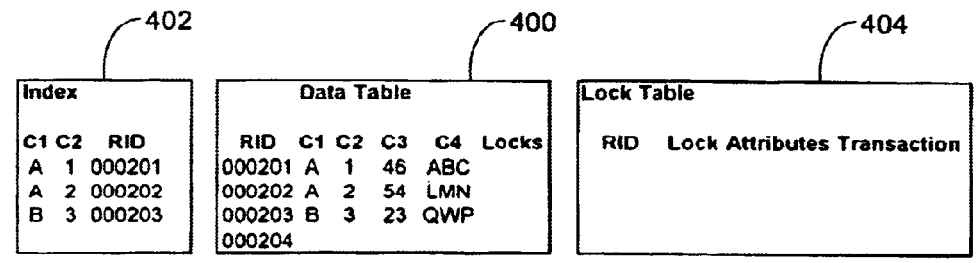
FIGS. 4(A)–4(F) are a sequence of database tables to show the same underlying data transaction sequence as FIGS. 2(A)–2(F), but executed using a database management system and method in accordance with the present invention to avoid the deadlock state.

With reference first to FIGS. 4(A)–4(F), a transaction sequence which is identical to that of FIGS. 2(A)–2(F) is carried out using the improved DBMS. It will be seen that the behavior of the improved DBMS is identical to that of the prior art DBMS for this transaction sequence, and no deadlock occurs in either case. FIG. 4(A) shows identical starting conditions to those of FIG. 2(A), and includes a data table 400, an index table 402, and a lock table 404.

Figure 4B:
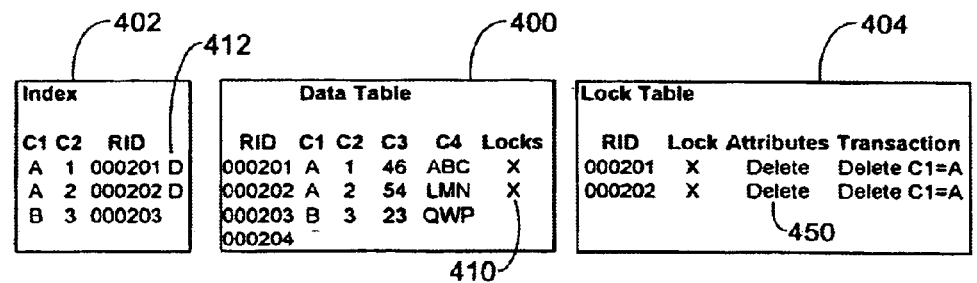

With reference next to FIG. 4(B) and with continuing reference to FIG. 1, a delete transaction "Delete C1=A" is initiated by the transaction manager 62. The delete transaction instructs deletion of all rows for which C1=A. It will be observed that rows RID=000201 and RID=000202 meet this criterion. As shown in the data table 400, exclusive X-locks 410 are placed on rows RID=000201 and RID=000202 by the lock manager 68, and corresponding information is written into the lock table 404. It will be particularly noted that, in the lock table 404, the granted X-locks have the Delete attribute set 450. In accordance with the preferred embodiment of the invention, the Delete attribute flag is set because these X-locks are associated with a Delete transaction. Also, the unique key index table 402 is updated by the index manager 66 to include an indication that the rows RID=000201 and RID=000202 are to be deleted, as indicated by the "D" flag 412 marking those index entries. Although the Delete C1=A transaction has been initiated at the time shown in FIG. 4(B), it has not been committed. Therefore, the information contained in rows RID=000201 and RID=000202 has not yet been removed.

Figure 4C:
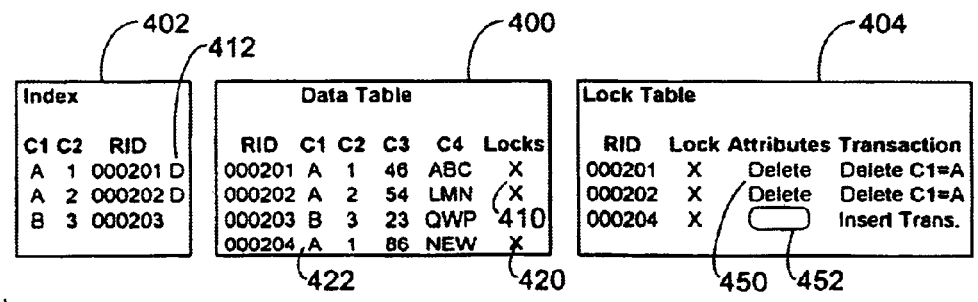

With reference next to FIG. 4(C) and with continuing reference to FIG. 1, while the Delete C1=A transaction remains uncommitted, a second, typically unrelated transaction is initiated. The second transaction is an Insert transaction. Using the data manager 64, the transaction manager 62 obtains an X-lock 420 on row RID=000204 of the data table 400 via the lock manager 68, and inserts the data 422 into data table 400 via the data manager 64. It will be noticed that the X-lock 420 does not have the Delete attribute set 452, since this X-lock was granted to an insert transaction.

Figure 4D:
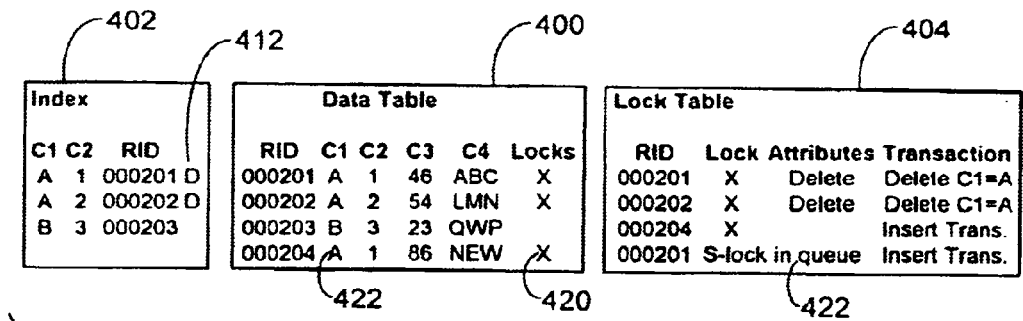

With reference now to FIG. 4(D) and with continuing reference to FIG. 1, the index manager 66 now attempts to update the unique key index table 402 to reflect the inserted row 422. The index manager 66 finds an entry with key C1,C2=A,1 already in the index table 402 which points to data table row RID=000201. However, this index entry is flagged for deletion 412, i.e. it is pseudo-deleted. If the Delete C1=A transaction has actually committed, then the key C1,C2=A,1 is available and the index manager 66 is free to update the index.

The index manager therefore checks whether the deletion of row RID=000201 has been committed by requesting a Conditional S-lock through the lock manager 68. However, the requested Conditional S-lock is incompatible with an X-lock with the Delete attribute SET and the request for the Conditional S-lock will be denied. Therefore, the lock manager 68 follows up this denied Conditional S-lock with a request for a normal (unconditional) S-lock on the same row. The normal (unconditional) S-lock request is also incompatible with the existing X-lock on row RID=000201 and is queued 424 as shown. This queuing is appropriate since the Delete C1=A transaction has in fact not yet committed. The queuing of the normal (unconditional) S-lock request suspends the insert transaction, thereby ensuring that the unique key rule is obeyed.

Figure 4E:
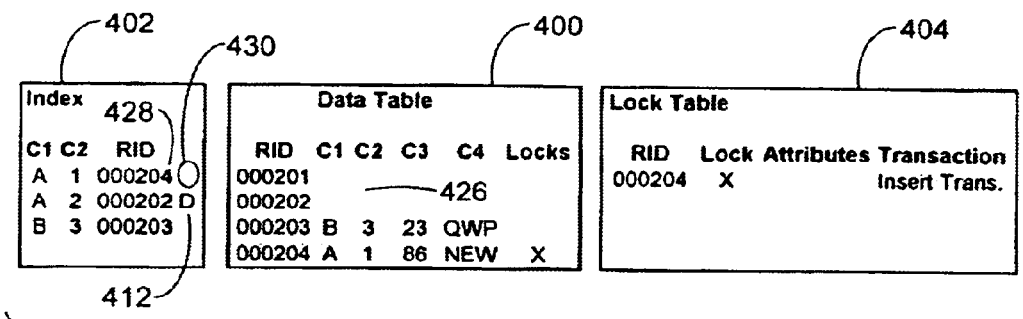

With reference now to FIG. 4(E) and with continuing reference to FIG. 1, the Delete C1=A transaction commits. The data is deleted 426, and the queued normal (unconditional) S-lock 424 (FIG. 4(D)) is granted, indicating that the exclusive X-locks held by the Delete C1=A transaction have been released. After the queued S-lock 424 requested by the Insert transaction is granted, the index manager 66 replaces the row RID=000201 in the index table 402 with the new row value RID=000204 428, releases the S-lock on RID=000201, and resets the pseudo-delete flag 430. The Insert transaction related to row RID=000204 remains in the lock table 204. The index entries of the deleted items at row RID=000202 remain only pseudo-deleted, i.e. flagged as deleted 412, but remain in the unique key index table 402.

Figure 4F:
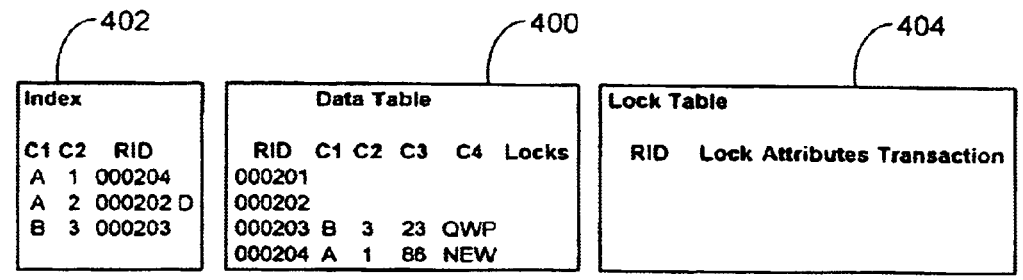

With reference next to FIG. 4(F) and with continuing reference to FIG. 1, the Insert transaction is shown committed and the X-lock on row RID=000204 released, and the lock table 404 is completely cleared.

It will be appreciated from the operations depicted in FIGS. 4(A)–4(F) are similar to the operations depicted in FIGS. 2(A)–2(F), except that: (i) when the delete transaction requests an X-lock, the Delete attribute is SET; and (ii) a Conditional S-lock is initially requested, which however is rejected as incompatible with an X-lock with the delete attribute ON. The denied Conditional S-lock is followed up by a normal (unconditional) S-lock, so that the sequence step shown in FIG. 4(D) is essentially similar to the sequence step shown in FIG. 2(D). In neither case does a deadlock occur, and in both cases a potential compromise of data integrity is prevented.

Figure 5A:
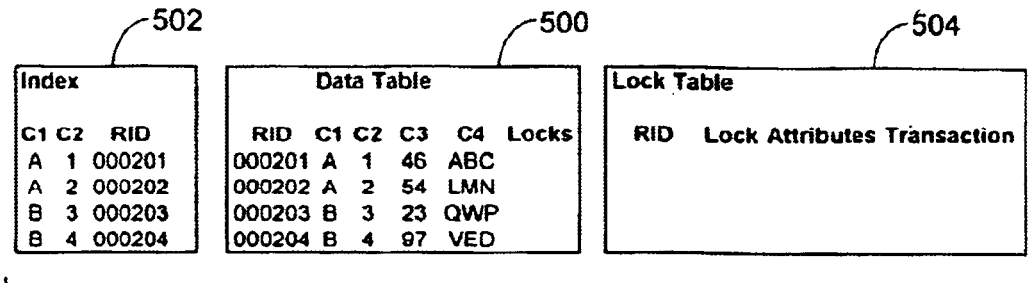
FIGS. 5(A)–5(H) are a sequence of database tables to show the same underlying data transaction sequence as FIG. 3, but executed using a database management system and method in accordance with the present invention, whereby the deadlock situation of FIG. 3 is avoided.

With reference now to FIG. 5(A)-5(H), the transaction sequence of FIGS. 3(A)–3(F) is repeated, but using the improved DBMS of the preferred embodiment of the present invention. It will be seen that, unlike the case of FIGS. 3(A)–3(F) involving the prior art DBMS, the improved DBMS overcomes the deadlock situation and properly implements the insert operations. FIG. 5(A) shows identical starting conditions to those of FIG. 3(A), and includes a data table 500, a unique key index table 502, and a lock table 504.

Figure 5B:
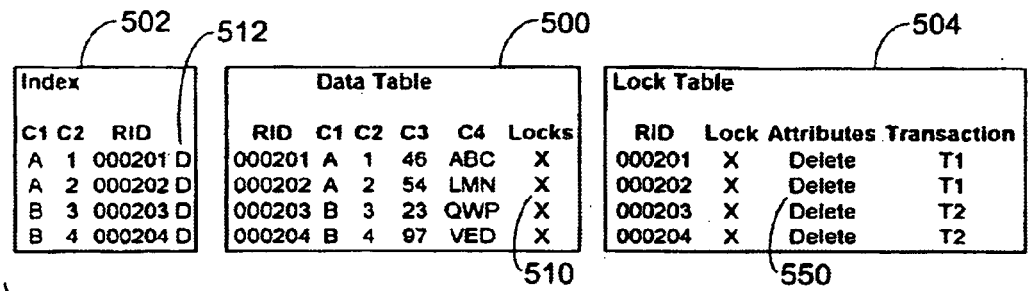

With reference to FIG. 5(B) and with continuing reference to FIG. 1, two essentially simultaneous Delete transactions T1 and T2 are initiated. Transaction T1 instructs deletion of rows with C1=A, and transaction T2 instructs deletion of rows with C1=B. As all rows shown have C1=A or C1=B, the transaction manager 62 requests via the data manager 64 that X-locks 510 be placed on all four rows. The lock manager 68 grants the X-locks, and the X-lock parameters are recorded in the lock table 504 as shown. It will be particularly noted that, in the lock table 504, the X-locks granted have the Delete attribute flag SET 550, which is appropriate as these X-locks are associated with Delete transactions. Additionally, the corresponding index entries are flagged as deleted 512 by the index manager 66.

Figure 5C:
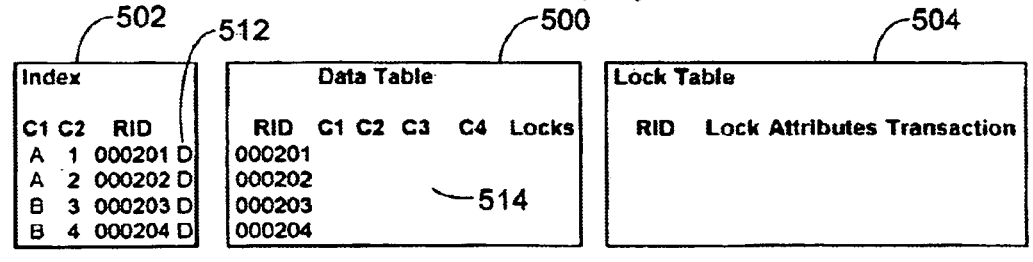

With reference to FIG. 5(C) and with continuing reference to FIG. 1, delete transactions T1 and T2 commit. The data is deleted 514 from the data table 500 and the locks 510 are removed. Importantly, the index entries are merely flagged for deletion 512 but remain in the index 502. It will be appreciated that FIGS. 5(A)–5(C) are essentially similar to FIGS. 3(A)–3(C), but with the additional setting of the Delete attribute 550 in the lock table 504. Because no additional lock requests were made on these rows while the X-locks of the Delete transactions T1 and T2 were in effect, this difference is of no consequence to this point.

Figure 5D:
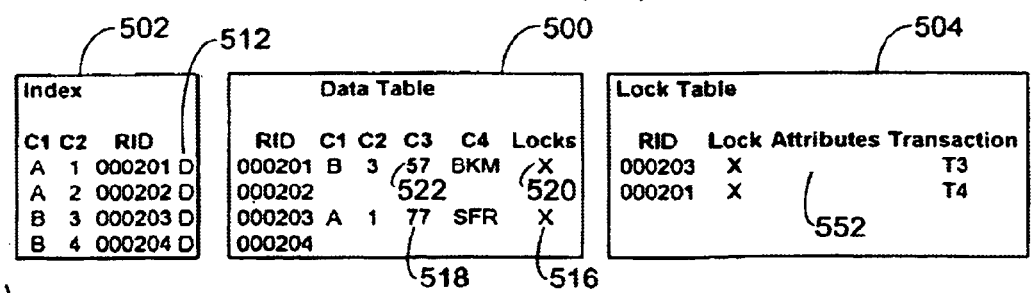

With reference now to FIG. 5(D) and with continuing reference to FIG. 1, two new transactions T3 and T4 are initiated by the transaction manager 62. Transaction T3 is an Insert transaction that instructs insertion of a row C1,C2,C3,C4=A,1,77,SFR. Transaction T4 is an Insert transaction that instructs insertion of a row C1,C2,C3,C4=B,3,57,BKM. The two transactions are initiated essentially simultaneously. The data manager 64 searches for available rows in the data table 500, locates and locks 516 row RID=000203, and writes the data of Insert transaction T3 therein 518. The data manager 64 also locates and locks 520 row RID=000201, and writes the data of Insert transaction T4 therein 522. The lock parameters are recorded in the lock table 504 as shown.

It will be noticed that the X-locks 516 and 520 do not have the Delete attribute flag set 552, since these X-locks were granted to Insert transactions rather than to Delete transactions.

Figure 5E:
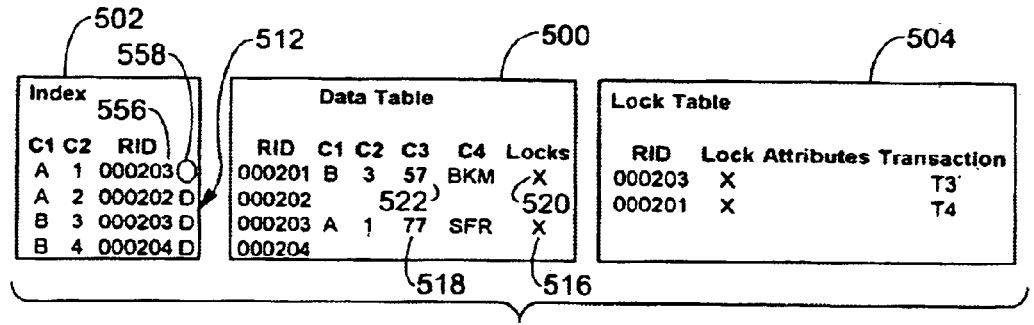

With reference now to FIG. 5(E) and with continuing reference to FIG. 1, the transaction manager 62 next instructs the index manager 66 to update the unique key index table 502 to reflect the inserted entry 518 of Insert transaction T3. The index manager 66 locates an entry with key C1,C2=A,1 already in the index table 502 which points to data table row RID=000201. However, this index entry is flagged for deletion 512, (FIG. 5(D)) i.e. it is pseudo-deleted. If the Delete transaction has committed, then the key C1,C2=A,1 is available and the index manager 66 is free to update the index.

The index manager therefore requests a Conditional S-lock of row RID=000201 through the lock manager 68 to determine whether the Delete transaction has committed. The lock manager 68 locates an X-lock 520, which transaction T4 placed on row RID=000201. However, because the requested Conditional S-lock is compatible with an X-lock with the Delete attribute flag NOT SET or OFF, the lock manager 68 grants the Conditional S-lock. This granting of the Conditional S-lock is appropriate because the Delete transaction T1 has committed. After the Conditional S-lock requested by Insert transaction T3 is granted, the index manager 66 updates the unique key index table 502 by changing the RID pointer of the C1,C2=A,1 key from RID=000201 to RID=000203 556, releases the S-lock on RID=000201, and resets its pseudo-delete flag 558.

Thus, unlike the prior art case depicted in FIG. 3(E) wherein the S-lock was queued and transaction T3 suspended, here Insert transaction T3 is permitted to continue. Because the Conditional S-lock was granted, the lock manager 66 unambiguously determines that the Delete transaction which set the pseudo-delete flag of the C1,C2=A,1 index key has already committed. Since the deletion of the previous C1,C2=A,1 entry has committed, the Insert transaction T3 is free to update the index.

Figure 5F:
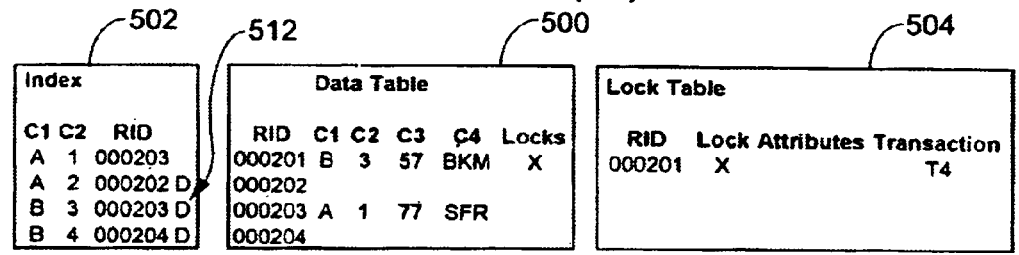

With reference next to FIG. 5(F) and with continuing reference to FIG. 1, Insert transaction T3 is shown committed and the X-lock on row RID=000203 released. Transaction T3 removes its X-lock on row RID=000203 and only the X-lock on row RID=000201 asserted by Insert transaction T4 remains in the lock table 504.

Figure 5G:
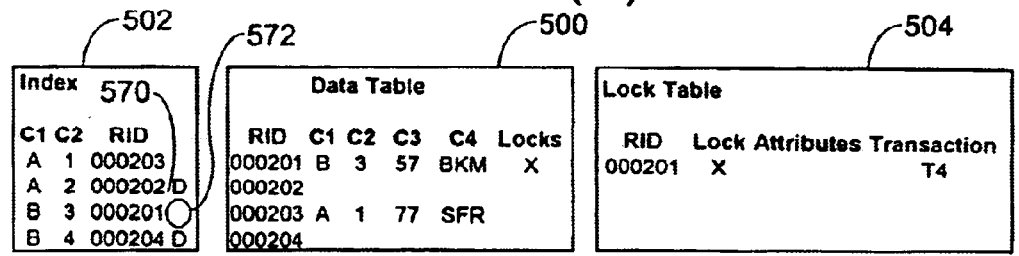

With reference now to FIG. 5(G) and with continuing reference to FIG. 1, the transaction manager 62 now instructs the index manager 66 to update the unique key index table 502 to reflect the inserted entry 522 (FIG. 5(D)) of Insert transaction T4. The index manager 66 finds an entry with key C1,C2=B,3 already in the index 502 which points to data table row RID=000203. However, this index entry is flagged for deletion 512 (FIG. 5(F)), i.e. it is pseudo-deleted. If the delete transaction has committed, then the key C1,C2=B,3 is available and the index manager 66 is free to update the index.

The index manager therefore requests a Conditional S-lock of row RID=000203 through the lock manager 68 to find out if the delete transaction has committed. Finding no previous lock on RID=000203, the lock manager grants the Conditional S-lock. After the Conditional S-lock requested by Insert transaction T4 is granted, the index manager 66 updates the unique key index table 502 by changing the RID pointer of the C1,C2=B,3 key from RID=000203 to RID=000201 570, releasing the S-lock on RID=000203, and resetting its pseudo-delete flag 572. Thus, unlike the prior art case depicted in FIG. 3(F) wherein the S-lock was queued and Insert transaction T4 suspended thereby producing a deadlock situation, here the Insert transaction T4 is permitted to continue because by using the Conditional S-lock the lock manager unambiguously determines that the delete transaction which set the pseudo-delete flag of the C1,C2=B,3 index key has already committed. Since the deletion of the previous C1,C2=B,3 entry has committed, transaction T4 is free to update the index.

Figure 5H:
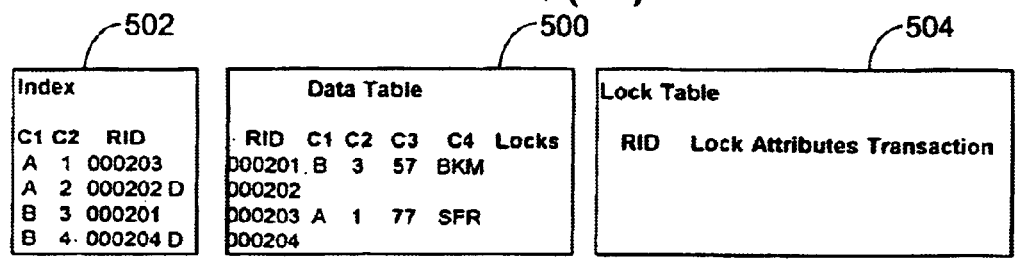

With reference next to FIG. 5(H) and with continuing reference to FIG. 1, Insert transaction T4 commits. Insert transaction T4 removes its X-lock on row RID=000201, and the lock table 504 is cleared of all locks.

In the sequence depicted in FIGS. 5(E)–5(H), it was assumed that the Conditional S-lock of transaction T3 was requested before the Conditional S-lock of transaction T4. However, it will be appreciated that had the lock request order been reversed, an equivalent result is obtained, namely that the two insert transactions T3 and T4 would have successfully completed without deadlock. It is therefore recognized that the improved DBMS of the invention overcomes the prior art limitations depicted in the example of FIGS. 3(A)–3(F) for a unique key index.

Figure 6:
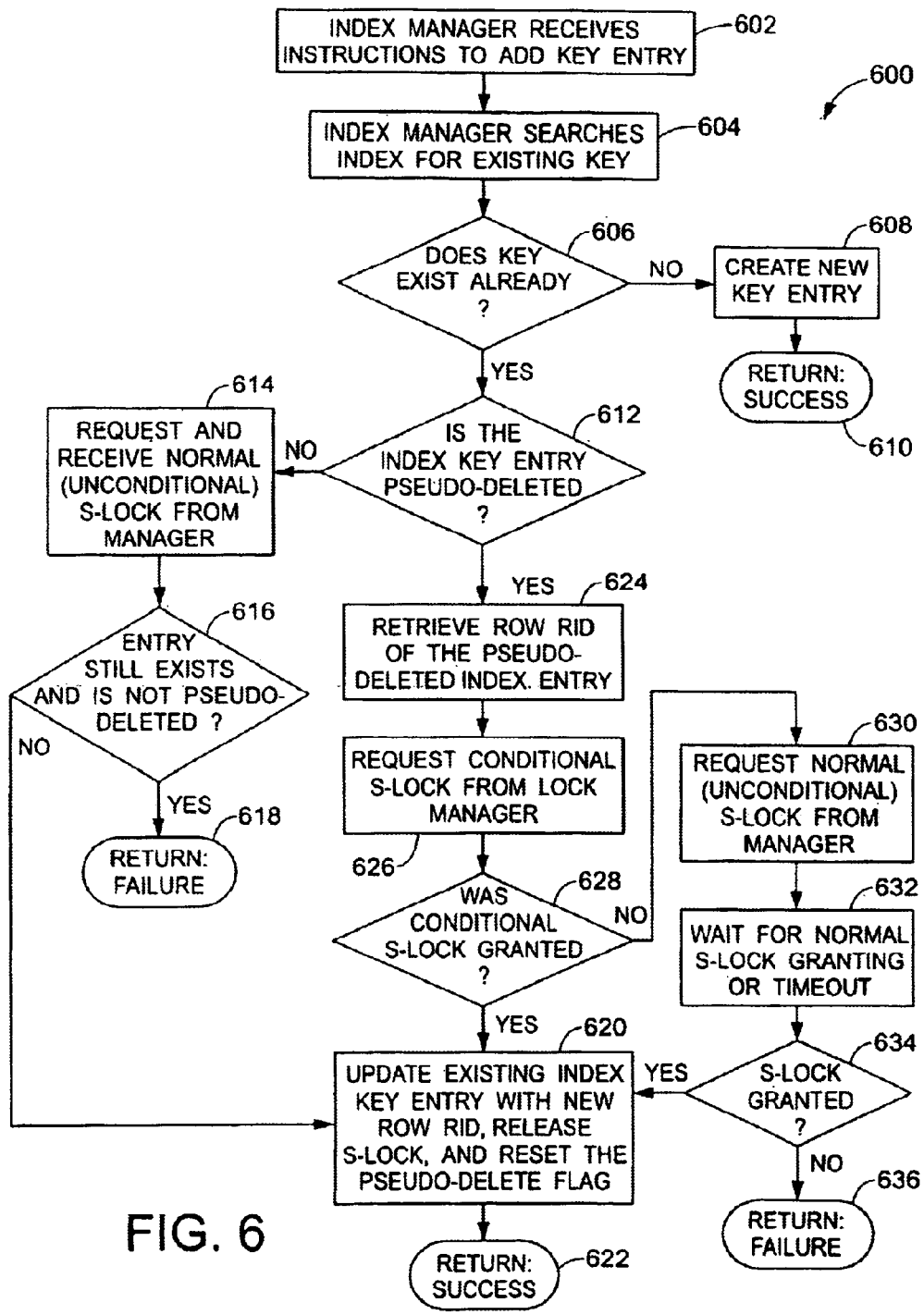
FIG. 6 shows the preferred method by which the subject DBMS index manager processes index updates and index additions in accordance with the invention.

With reference now to FIG. 6, and with continuing reference to FIG. 1, the preferred method 600 by which the improved DBMS index manager 66 processes updates to a unique key index in accordance with the present invention, is described. The index manager 66 receives instructions to add a key entry in a step 602. The index manager 66 searches the unique key index 42 for an existing key in the relevant unique key index table in a step 604. A decision 606 is made based on the results of the searching 604. If the key does not already exist, then the index manager 66 creates a new key entry based on the received instructions in a step 608, and reports success to the transaction manager 64 in a return step 610.

If, however, the key does already exist in the index, the index manager next checks whether the existing key entry is pseudo-deleted in a decision step 612. If the entry is not pseudo-deleted, the index manager 66 requests a normal (unconditional) S-lock on the key entry RID in a step 614. After the S-lock is granted, the transaction manager checks if the entry still exists and is not pseudo-deleted in a decision step 616. If the entry does exist and is not pseudo-deleted, then the index manager 66 reports failure in a step 618 to the transaction manager 64 in a return step 614, because carrying out the key entry addition would violate the unique key rule. Otherwise, the index manager 66 updates the existing key entry on behalf of this insert transaction, releases the normal (unconditional) S-lock and resets the pseudo-delete flag in a step 620, and reports success in a step 622.

The steps 614 and 616 particularly cover the exemplary case of parallel inserts with the same key value by different transactions. The second insert transaction is directed to wait behind the first insert transaction in the step 614 (i.e., the S-lock of the second transaction is queued until the X-lock of the first transaction is released). If the first insert transaction did not commit, it will preferably mark the inserted key entry as pseudo-deleted before releasing its X-lock, thus enabling the decision step 616 to transfer control to the step 620 and thereby update the index key entry on behalf of the second insert transaction.

Returning back to the decision step 612 now, if the existing key entry is pseudo-deleted, then the index manager next determines whether the deletion transaction has actually committed. To make this determination, the index manager 66 retrieves the row RID pointer of the pseudo-deleted index entry in a step 624, and requests a Conditional S-lock on that row from the lock manager 68 in a step 626. Another decision point 628 is reached based upon whether or not the lock manager 68 grants the Conditional S-lock.

As discussed previously, the requested Conditional S-lock is compatible with an X-lock whose Delete attribute flag is NOT SET or OFF, but the requested Conditional S-lock is not compatible with an X-lock whose Delete attribute is SET or ON. The granting of the Conditional S-lock at step 628 therefore indicates that the delete transaction which set the pseudo-deletion flag of the index entry has already committed. Furthermore, this granting will not be improperly prevented by the X-lock of any intervening transaction which seeks to write to the row after the delete transaction has committed, because the X-lock of any intervening transaction would be a non-delete transaction and so the delete attribute of the X-lock would be off or not set.

Thus, if the Conditional S-lock is granted by the lock manager 68, the index manager 66 updates the existing key entry with the new row RID, releases the Conditional S-lock, and resets (i.e., turn OFF) the pseudo-delete flag of the index key entry in the step 620. The index manager 66 then reports success to the transaction manager 62 in the return step 622.

If, however, the Conditional S-lock is not granted in step 628, this indicates that the blocking X-lock is due to the Delete transaction which set the pseudo-delete flag and which has not yet committed. The index cannot be updated unless and until the Delete transaction commits. In a preferred embodiment, the lock manager 68 follows up a denied Conditional S-lock with a normal (unconditional) S-lock in a step 630. The unconditional S-lock is also blocked by the X-lock of the uncommitted Delete transaction and is queued. Thereafter, a waiting period 632 terminates either when the Delete transaction commits and removes its X-lock so that the unconditional S-lock is granted, or when a predetermined timeout period elapses. At a decision point 634, if the timeout has been reached and the unconditional S-lock remains queued, the index manager 66 reports failure to the transaction manager 64 in a return step 636.

However, if the S-lock is granted at any time during the waiting period 632, the index is updated, the normal (unconditional) S-lock is released and the pseudo-delete flag is reset in the step 620, and the index manager 66 reports success in the step 622. These steps are carried out when the unconditional S-lock is granted because the granting of the unconditional S-lock unambiguously indicates that the Delete operation has committed and removed its X-lock.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A database management system (DBMS) for managing a database application, the database application including a database having at least one table, and an index having at least one unique key index table corresponding to the at least one table, the DBMS comprising:
   a data manager for managing updates of the database;
   an index manager for managing updates of the unique key table index;
   a transaction manager for executing database transactions in cooperation with the data manager and the index manager; and,
   a lock manager cooperative with the index manager and the data manager for restricting access to a first table element of said at least one table by assigning one or more locks thereto, said locks being selected from a plurality of lock types including at least,
      an exclusive X-lock that enables exclusive access to the first table element, the exclusive X-lock including a Delete X-lock attribute logically associated therewith, a SET state of the Delete X-lock attribute being indicative of a transaction holding the X-lock being a delete transaction;
      an unconditional S-lock that enables shared access to the first table element and is selectively assigned by the lock manager to the first table element only when the first table element is without an exclusive X-lock previously assigned thereto; and
      a conditional S-lock that enables shared access to the first table element and is selectively assigned by the lock manager to the first table element only when the first table element is either without an exclusive X-lock previously assigned thereto or is without an exclusive X-lock having its Delete X-lock attribute SET assigned thereto.

2. The DBMS as set forth in claim 1, wherein:
   the unique key index table further includes a pseudo-delete flag corresponding to each key entry of the unique key index table; and,
   the index manager selectively SETs the pseudo-delete flag to indicate deletion of a table row corresponding to the index key entry.

3. The DBMS as set forth in claim 2, wherein in response to receiving a request from the index manager to enter an index key entry and a corresponding new row identification RID in which the index key entry corresponds to an existing index key entry whose pseudo-delete flag SET, the index manager is operative to:
   request a Conditional S-lock on the table row corresponding to the existing index key entry; and,
   conditional upon the Conditional S-lock on the table row corresponding to the existing index key entry being granted by the lock manager, update the table index key entry with the new row identification RID, release the Conditional S-lock on the table row corresponding to the existing index key entry, and reset the pseudo-delete flag to and OFF state.

4. The DBMS as set forth claim 3, wherein in response to receiving a request from the index manager to enter an index key entry and a corresponding new row identification RID in which the index key entry corresponds to an existing index key entry whose pseudo-delete flag is SET, the index manager is adapted to:
   conditional upon the Conditional S-lock on the table row corresponding to the existing index key entry being denied by the lock manager, request an unconditional S-lock on the table row corresponding to the existing index key entry; and,
   upon granting of the unconditional S-lock by the lock manager, update the table index key entry with the new row identification RID, release the unconditional S-lock, and reset the pseudo-delete flag.

5. The DBMS as set forth in claim 2, wherein in response to receiving a request from the index manager to enter an index key entry and a corresponding new row identification RID in which the index key entry corresponds to an existing index key entry whose pseudo-delete flag is NOT SET, RESET, or OFF, the index manager is operative to:

request an unconditional S-lock on the table row corresponding to the existing index key entry; and, upon granting of the unconditional S-lock on the table row corresponding to the existing index key entry by the lock manager and conditional upon the index key entry having its pseudo-delete flag SET, update the table index key entry with the new row identification RID, release the unconditional S-lock, and reset the pseudo-delete flag.

6. A database management method for entering a key and a new row identification RID into a unique key table index of a database application that uses pseudo-deletion of table index entries, comprising:

searching the unique key table index for the key;

when a pseudo-deleted table index entry corresponding to the key is located during the searching step:

requesting a Conditional S-lock on a table row indexed by the pseudo-deleted table index entry, said Conditional S-lock having compatibility characteristics respective to an X-lock including:

the Conditional S-lock not being compatible with an X-lock having a Delete attribute logically associated with the X-lock that is SET or ON, and the Conditional S-lock being compatible with an X-lock having a Delete attribute logically associated with the X-lock that is NOT SET or OFF; and, conditional upon receiving an indication that the Conditional S-lock is granted, updating the table index entry with the new row identification RID and resetting the pseudo-delete flag; and, conditional upon not locating a table index entry corresponding to the key during the searching step, updating the table index by adding the key and the new row identification RID.

7. The method according to claim 6, wherein the step of receiving an indication that the Conditional S-lock is granted includes the steps of:

granting the Conditional S-lock conditional upon the table row indexed by the pseudo-deleted table index entry not having an X-lock assigned thereto;

granting the Conditional S-lock conditional upon the table row indexed by the pseudo-deleted table index entry having an X-lock assigned thereto wherein said X-lock has its Delete attribute not set, reset, or off; and receiving an indication that the Conditional S-lock is granted conditional upon the granting of the Conditional S-lock.

8. The method according to claim 7, further including the steps:

conditional upon receiving an indication that the Conditional S-lock is denied:

requesting an unconditional S-lock on the table row indexed by the pseudo-deleted table index entry; and conditional upon receiving an indication that the unconditional S-lock is granted, updating the table index entry with the new row identification RID and resetting the pseudo-delete flag.

9. An article of manufacture comprising a program storage medium readable by a computer and embodying one or more instructions executable by the computer to perform method steps for entering a key and a new row RID into a unique key table index of a database stored on a data store connected to the computer, the unique key table index using pseudo-deletion of table index entries, the method comprising the steps of:

searching the unique key table index for the key;

conditional upon locating a pseudo-deleted table index entry corresponding to the key during the searching step:

requesting a Conditional S-lock on a table row indexed by the pseudo-deleted table index entry, said Conditional S-lock being incompatible with an X-lock acquired by a delete operation and being compatible with an X-lock not acquired by a delete operation, based on a Delete attribute logically associated with the X-lock, and conditional upon receiving an indication that the Conditional S-lock is granted, updating the table index entry with the new row identification RID and resetting the pseudo-delete flag; and, conditional upon not locating a table index entry corresponding to the key during the searching step, updating the table index by adding the key and the new row identification RID.

10. The article of manufacture according to claim 9, wherein the step of receiving an indication that the Conditional S-lock is granted includes the steps of:

granting the Conditional S-lock conditional upon the table row indexed by the pseudo-deleted table index entry not having an X-lock assigned thereto;

granting the Conditional S-lock conditional upon the table row indexed by the pseudo-deleted table index entry having an X-lock assigned thereto wherein said X-lock has a Delete attribute that is not set, reset, or off; and receiving an indication that the Conditional S-lock is granted conditional upon the granting of the Conditional S-lock.

11. The article of manufacture according to claim 10, wherein the method further includes the steps, to be executed conditional upon receiving an indication that the Conditional S-lock is denied, of:

requesting an unconditional S-lock on the table row indexed by the pseudo-deleted table index entry; and conditional upon receiving an indication that the unconditional S-lock is granted, updating the table index entry with the new row identification RID and resetting the pseudo-delete flag.

12. A lock manager for use in a database management system (DBMS) managing a database application including a database having at least one table and cooperative with an index manager and a data manager for restricting access to a first table element of said at least one table by assigning one or more locks thereto including at least an exclusive X-lock that enables exclusive access to the first table element, the exclusive X-lock including a Delete attribute logically associated therewith, a SET state of the Delete attribute being indicative of a transaction holding the X-lock being a delete transaction.

13. The lock manager according to claim 12, wherein:

the lock manager is adapted to restrict access to said first table element by assigning a Conditional S-lock that enables shared access to the first table element and is selectively assigned by the lock manager to the first table element only when the first table element does not have an X-lock with its Delete attribute in a SET state assigned thereto.

14. The lock manager as set forth in claim 13, wherein:

the index manager manages a unique key index table that includes a pseudo-delete flag corresponding to each key entry of the unique key index table; and, the index manager is operative to selectively SET the pseudo-delete flag to indicate deletion of a table row corresponding to the index key entry.

15. The lock manager as set forth in claim 14, wherein:

in response to receiving a request from the transaction manager to enter an index key entry and a corresponding new row identification RID in which the index key entry corresponds to an existing index key entry of the unique key index table whose pseudo-delete flag is SET, the index manager is operative to request a Conditional S-lock on the table row corresponding to the existing index key entry; and, the lock manager is operative to grant the Conditional S-lock on the table row corresponding to the existing index key entry being only when:

the table row is without an exclusive X-lock assigned thereto, or the table row has an exclusive X-lock assigned thereto with its Delete attribute not in said SET state, to enable the index manager to update the table index key entry with the new row identification RID, release the Conditional S-lock on the table row corresponding to the existing index key entry, and reset the pseudo-delete flag to and OFF state.

* * * * *

UNITED STATES PATENT AND TRADEMARK OFFICE
CERTIFICATE OF CORRECTION

PATENT NO. : 6,944,615 B2 Page 1 of 1
DATED : September 13, 2005
INVENTOR(S) : Teng et al.

It is certified that error appears in the above-identified patent and that said Letters Patent is hereby corrected as shown below:

<u>Column 18,</u>
Line 13, delete "based on a Delete attribute logically associated with the X-lock,".

Signed and Sealed this

Twenty-first Day of March, 2006

JON W. DUDAS
*Director of the United States Patent and Trademark Office*